United States Patent [19]

Kraus

[11] Patent Number: 5,025,671

[45] Date of Patent: Jun. 25, 1991

[54] HIGH RATIO PLANETARY TYPE TRACTION ROLLER TRANSMISSION

[75] Inventor: Charles E. Kraus, Austin, Tex.

[73] Assignee: Excelermatic Inc., Austin, Tex.

[21] Appl. No.: 488,990

[22] Filed: Mar. 5, 1990

[51] Int. Cl.$^5$ .................... F16H 13/02; F16H 13/00
[52] U.S. Cl. ........................... 74/206; 74/209; 475/183; 475/197
[58] Field of Search ............ 475/165, 183, 190, 193, 475/194, 197; 74/206, 207

[56] References Cited

U.S. PATENT DOCUMENTS

| | | | |
|---|---|---|---|
| 1,737,997 | 12/1929 | Garrard | 475/183 |
| 2,680,388 | 6/1954 | Lazarowicz | 475/190 |
| 4,052,915 | 10/1977 | Kraus | 74/206 X |
| 4,060,010 | 11/1977 | Heden | 475/183 |
| 4,846,008 | 7/1989 | Kraus | 475/194 |

FOREIGN PATENT DOCUMENTS

| | | | |
|---|---|---|---|
| 0010860 | 1/1979 | Japan | 475/197 |
| 0089763 | 3/1979 | Japan | 475/197 |
| 0413802 | 7/1934 | United Kingdom | 475/197 |

Primary Examiner—Allan D. Herrmann
Assistant Examiner—Khoi Q. Ta

[57] ABSTRACT

In a traction roller transmission which has disposed in a housing two planetary type transmission structures each having traction rollers disposed between spaced concentric sun rollers and traction rings and supported by support members of which one which is associated with one of the transmission structures carries the sun of the other transmission structure and the other is connected to the transmission output shaft while the input shaft carries the sun of the one transmission structure (the planetary rollers are supported in an inclined position), and the traction rings are axially curved and forced toward one another so as to engage therebetween the planetary rollers which are supported at predetermined angles selected such that their engagement forces with the sun rollers and traction rings correspond to the torque to which they are subjected during operation.

7 Claims, 2 Drawing Sheets

HIGH RATIO PLANETARY TYPE TRACTION ROLLER TRANSMISSION

BACKGROUND OF THE INVENTION

The invention relates to a high ratio planetary type traction roller transmission utilizing two planetary transmission stages.

Such high ratio transmissions are needed in large numbers for converting rotary motion from a high speed motor, for example, for low speed, high torque applications. However, various machines utilize various speeds and torques so that, for different applications, different transmissions are required with different sun rollers, different planetary rollers and different traction rings.

The motion transmitting traction surfaces of such transmissions need to be engaged with one another with forces sufficient to transmit the respective torque and, as the torque changes within a transmission from stage to stage, so do the engagement force requirements. One could of course provide for maximum engagement forces for all the traction surfaces but then all the traction surfaces would be exposed to full loads at all times which not only reduces their lives but also reduces transmission efficiency and would require the use of relatively expensive materials for the traction surface areas.

In the arrangement according to U.S. Pat. No. 4,060,010, for example, the traction roller engagement forces are the same for all the stages although the torque at the drive shaft end of the transmission is by far lower than at the output shaft end.

The same can be said for the arrangement shown in U.S. Pat. No. 3,490,311 in which a single engagement cam structure is provided for both main planetary drive structures providing for both the same engagement forces.

It is the principal object of the present invention to provide a two stage planetary type traction roller transmission in which the traction surfaces are subjected essentially only to the forces needed for the transmission of the appropriate torque and wherein, with the same transmission housing and traction ring structures, various transmission ratio planetary and sun rollers may be utilized, thereby providing for easy changeover to different transmission ratios or for a relatively large variety of different ratio transmissions with relatively few parts.

SUMMARY OF THE INVENTION

In a traction roller transmission which includes in a housing two planetary type transmission structures arranged in series for a high ratio speed change, each of the planetary type transmission structures has spaced concentric sun rollers and traction rings with planetary type traction rollers supported by support members in the space between, and in engagement with, the sun roller and the traction ring. An input shaft carries the sun roller of one of the transmission structures and the traction roller support member of said one transmission structure carries the sun of the other transmission structure while the traction roller support member of the other transmission structure is connected to the transmission output shaft. The traction rollers are supported at predetermined angles with respect to the transmission axis and the traction rings are axially curved and forced toward one another so as to engage therebetween the traction rollers, thereby generating radial traction surface contact forces which depend on the angle of inclination of the traction rollers, which angle is so selected that the traction surface contact forces correspond to the torque to which the traction surfaces of the planetary type transmission structures are subjected. With such an arrangement the traction surfaces are not subjected to unnecessarily large contact forces and structures with various ratios and correspondingly various angles may be utilized in connection with one type or even the same housing and traction rings.

SHORT DESCRIPTION OF THE DRAWINGS

FIG. 1 is a cross-sectional view of the transmission according to the invention; and FIG. 2 shows an embodiment with concentric input and output shafts.

DESCRIPTION OF A PREFERRED EMBODIMENT

Figure 1:
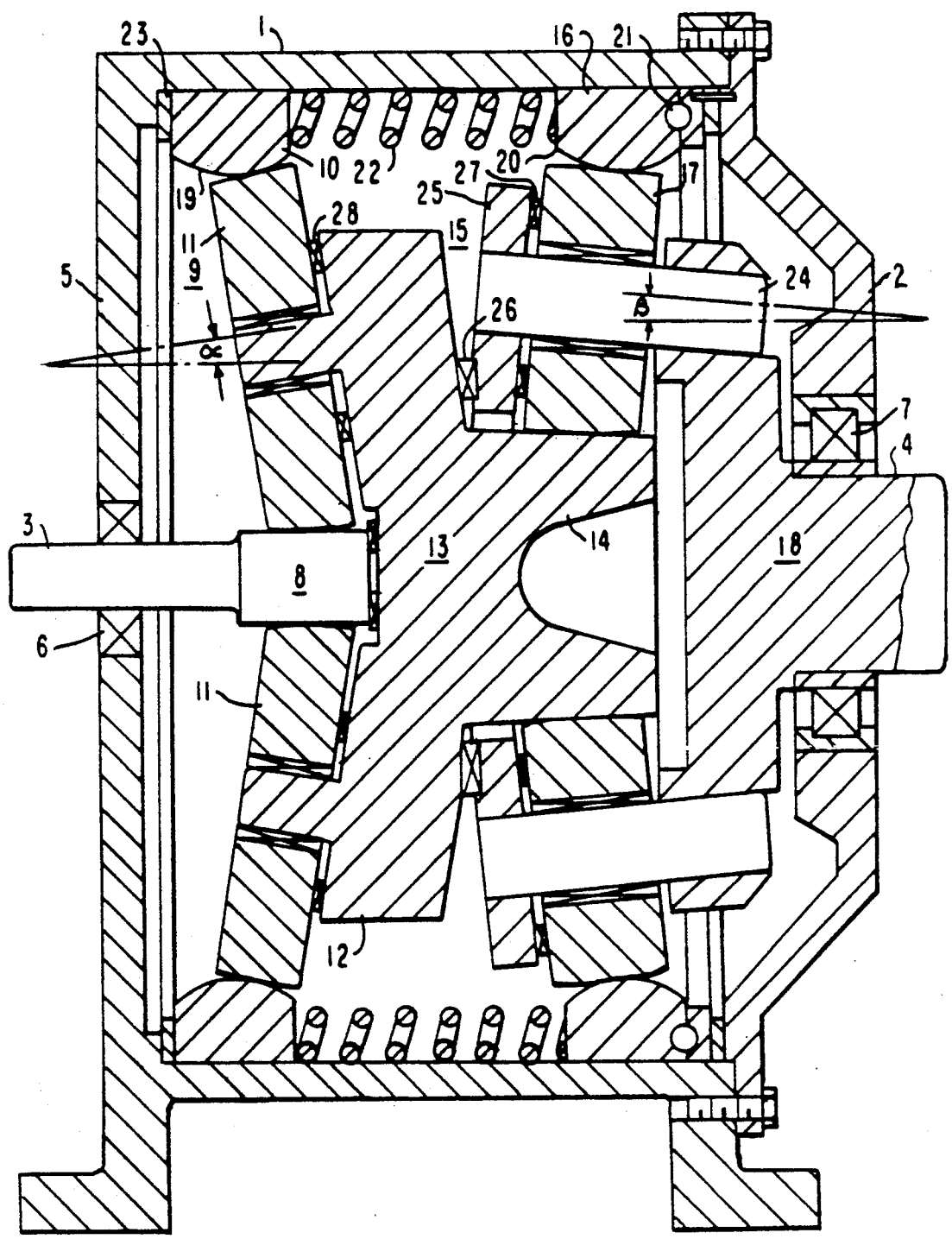

As shown in FIG. 1 the transmission includes a housing 1 which receives the transmission structure and is provided with a cover 2. Coaxial input and output shafts 3 and 4 are rotatably supported in the housing end wall 5 and the cover 2 by antifriction bearings 6 and 7.

The input shaft 3 is provided at its inner end with a sun roller structure 8 which forms the center roller of a first planetary traction roller structure 9 having a first traction ring 10 supported in the housing 1 in spaced relationship from the sun roller structure 8 and a first set of planetary type traction rollers 11 disposed in the space between the ring 10 and the sun roller 8 and in engagement with both of them. The traction rollers 11 are rotatably supported on a first planetary roller support structure 12 which is part of an intermediate transmission member 13 supporting the traction rollers 11 at a predetermined angle α with respect to the axis of the input shaft 3. The intermediate transmission member 13 is further provided with a roller structure 14 which forms the sun roller of a second planetary type traction roller transmission 15 having a second traction ring 16 supported with housing 1 in spaced relationship from the sun roller 14 and a second set of planetary type traction rollers 17 disposed in the space between, and in engagement with, the sun roller 14 and the traction ring 16. The traction rollers 17 are rotatably supported on a second planetary roller support structure 18 so as to be disposed at a predetermined angle β with respect to the axis of the output shaft 4. The second planetary roller support structure 15 is mounted on, or part of, the output shaft 4. The second sun roller structure 14 has a slightly conical surface defined by a cone having an apex preferably coinciding with the axes of the traction rollers 17 on the axis of the output shaft 4. The sun roller 8 of the first planetary type transmission structure is shown in FIG. 1 with a cylindrical surface, an arrangement wherein the apex of the cone defined by the conical surface of the traction rollers 11 is disposed on the cylindrical envelope of the sun roller 8.

Both traction rings 10 and 16 have inner traction surfaces 19 and 20 which are curved in axial direction such that the planetary traction rollers 11 and 17 engage them properly along a circular line independently of the angular inclination α or β of the planetary traction rollers. The surface areas 19 and 20 are shown in the drawings as being symmetrical but need to extend only from the innermost point only far enough to accommodate the largest angles α or β utilized in connection with a particular transmission design. It is noted however that preferably the rings 10, 16 are provided with symmetrical surface areas as shown in the drawings since this permits their reversal when worn on one side thereof. One of the traction rings, that is, traction ring 10, is mounted so that it is not rotatable whereas the other, that is, ring 16, is rotatably supported but has an axial cam structure 21 associated therewith of the type described, for example, in applicant's U.S. Pat. No. 4,052,915 which forces the ring 16 axially toward the ring 10 with a force that depends on the torque transmitted thereto by the rollers 17, thereby causing firm engagement of the traction rollers with their respective sun and ring structures. Cam springs 22 extend between the traction rings 10 and 16 in order to insure return of the ring 16 when the reaction torque forces thereon diminish. A spacer ring or a set of rings 23 is disposed between the traction ring 10 and the housing 1, the rings 23 being so selected as to insure a slight preload of all the traction surfaces.

The planetary traction rollers 17 are rotatably supported on shaft members 24 which are mounted at one of their ends to the support structure 18 and carry at their opposite ends a connecting ring 25 which interconnects all the shaft members 24 and which is adapted to transmit the axial thrust forces generated by the loading cam structure 21 to the intermediate transmission member 13 by way of an axial thrust bearing 26 arranged therebetween. Axial thrust bearings 27 and 28 are also arranged between the traction rollers 17 and the connecting ring 25 and between the traction rollers 11 and their support structure 12 for the transmission of the axial engagement forces.

The input shaft sun structure as shown in FIG. 1 is essentially cylindrical since cylindrical structures are easy to manufacture and since, because of the relatively high speed of the input shaft, the torque and the required surface contact forces are relatively low. Slight spin on its surface is therefore not damaging particularly if the surfaces of the traction rollers 11 are slightly curved as they may be because of the relatively low torque to be transmitted.

The slight curvature of the traction rollers and the angles α and β of their inclination are so selected as to provide the appropriate contact forces. A larger angle α, for example, provides for smaller contact forces in the planetary transmission structure 9 relative to those applied in the planetary transmission structure 15 since the axial forces applied to the traction rings are the same for both transmission structures.

The value for the relative engagement forces can be selected as desired depending on the selected transmission ratios. Various roller and sun sizes may be used in the same size housing simply by using different traction roller and sun structures. The housing and the traction rings 10 and 16 which are relatively expensive need not be different. They can accommodate any suitable roller size and inclination.

As mentioned earlier the arrangement permits to make different ratio transmissions with a single housing and a relatively small number of different internal parts. Depending on the selection of sizes for the rollers and sun structures a plurality of different ratio transmissions can be provided. With, for example, components for four ratios of 4, 6, 9 and 12, depending on their combination, twelve different transmissions with various ratios of 16, 24, 36, 48, 54, 72, 81 and 108 can be provided.

Figure 2:
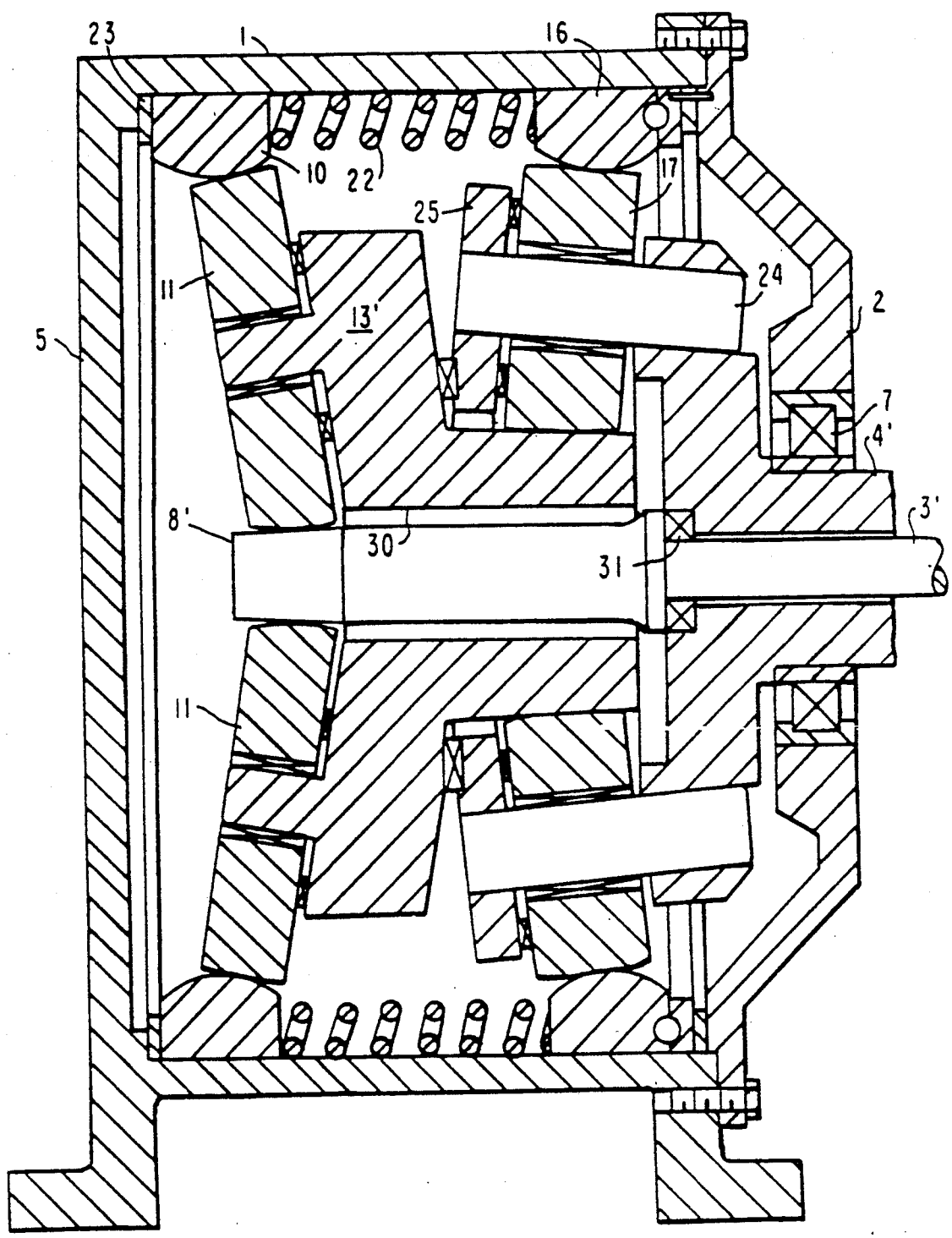

FIG. 2 shows an embodiment similar to that of FIG. 1 and therefore the same reference numerals are used where appropriate. However, as shown the input shaft 3' extends concentrically through the output shaft 4' and through a central bore 30 in the intermediate transmission member 13' and carries at its end a sun roller structure 8' which, in this case, is slightly conical for spin-free motion transmitting engagement with the planetary traction rollers 11. The shaft 3' is supported in the output shaft by a bearing 31 which is capable of taking up also the axial component of the engagement forces applied by the inclined planetary rollers 11 to the sun roller structure 8'.

As mentioned earlier, the inclination angles α and β for the planetary rollers 11 and 25 are selected such that the engagement forces generated by their engagement with the traction rings 10 and 16 are appropriate to transmit the torques to be transmitted at the various engagement locations. For example, the inclination angle α of the traction rollers 11 is larger than the inclination angle β of the traction rollers 25 since the torque to be transmitted by the rollers 11 is smaller than that to be transmitted by the rollers 25.

To determine the appropriate angles a computer program was developed which supplies the transmission design parameters when given the basic design features such as transmission ratio and maximum input or output torque. A printout is supplied as Att. 1 giving the design features of a particular drive as determined by the program.

```
                        2 STAGE F.R.D.
                    SUN INPUT   CARRIER OUTPUT

**************** INPUT DATA *********************
1=FIRST STAGE  2=SECOND STAGE      2            STAGE
OD OF SUN                          .632         SDIA
ID OF RING                         3.5          RDIA
OD OF RING                         4.5          RODIA
RING WIDTH                         1.5          RWDTH
SUN SPEED                          1545.45      SSPD
CARRIER SPEED                      0            CSPD
RING SPEED                         0            RSPD
NUMBER OF PLANETS                  4            PLAS
DESIGN HORSEPOWER-CARRIER          5.2          CDHP
DESIGN LIFE                        3000         DLIFE
LIFE SAFETY FACTOR                 1            LFAC
BASE OIL COEFFICIENT               .03          OILFAC
MU COMPUTATION FACTOR              1.           COMFAC
OIL FILM FACTOR                    2.25         FFAC
OIL OPERATING TEMPERATURE          175          TEM
ASSUMED CREEP FOR BTU LOSS         .005         CREEP
WIDTH BETWEEN GROOVES              .1           GR
PLANET WEIGHT FOR ANALYSIS         0            W
EFF SUN WIDTH FOR ANALYSIS         .4           EFSD
EFF RING WIDTH FOR ANALYSIS        .2           EFRD
RADIUS OF CURVATURE-PLANET         50           PC
RADIUS OF CURVATURE-RING           2            RCR
RING NEUTRAL RADIUS                0            RAD
RING MOMENT OF INERIA              0            MOMINT
RING X-SECTIONAL AREA              0            RAREA
RING SHAPE FACTOR                  1.2          SFAC
CENTIFUGAL DEFLECTION FACTOR       1            CFFAC
PRELOAD FOR TIMKEN                 60           PRRLOD
PRELOAD CONSTANT=1                 1            PRECONS
TAPANG                             5.98125E-02
                                                TAPANG
BALLDIA                            .25          BALLDIA
CAMSPR-BOTH SUN & RING             10           CAMSPR

**************** OUTPUT DATA *********************
***********************************************    DRIVE GEOMETRY
      RING DATA
RADIAL WIDTH OF RING               .5           RIO
RING MOMENT OF INERTIA             .01562       MOMINT
RING X-SECTIONAL AREA              .75          RAREA
RING MEAN RADIUS                   2            RAD
      PLANET DATA
PLANET SEPARATION ANGLE            90           BETA
PLANET DIAMETER                    1.434        PDIA
PLANET RADIUS OF REVOLUTION        1.033        R
PLANET CENTER SPACING              1.46088      PLSPC
PLANET SEPERATION                  .02688       PLSEP
***********************************************    MISC DATA
RING TO SUN RATIO                  5.53797      RTS
CARRIER OUT RATIO                  6.53797      RATIOC
DEFL CONSTANT (AT LOAD)            .0235        DCON
DEFL CONSTANT (BETWEEN LOAD)       .00667       DCON2
***********************************************    SPEEDS
CARRIER RPM                        236.381      CSPD
```

| | | |
|---|---|---|
| PLANET RPM (ABS) | -340.559 | PRPMA |
| PLANET RPM (BEARINGS) | -576.94 | PRPM |
| SURFACE SPEED - SUN | 3.6 | FPS |
| SURFACE SPEED - RING | 3.6 | FPSR |
| SSPD TO CSPD RATIO | 6.537 | RATIO1 |
| RSPD TO CSPD RATIO | 0 | RATIO2 |
| LIFE CONSTANT FOR SUN | 504452 | CIS |
| LIFE CONSTANT FOR RING | 598625 | CIR |

**************************************************** TORQUES AND HORSEPOWERS

| | | |
|---|---|---|
| CARRIER HORSEPOWER | 5.2 | CDHP |
| CARRIER TORQUE | 115.536 | CTORQ |
| PLANET BEARING FORCE | 335.535 | PFORC |
| PLANET TANGENTIAL FORCE | 167.767 | TFP |
| SUN TORQUE | 17.6715 | STORQ |
| SUN HORSEPOWER | 5.2 | SDHP |
| RING TORQUE | 97.8643 | RTORQ |
| RING HORSEPOWER | 0 | RDHP |

**************************************************** TRACTION CONTACT DATA

| | | |
|---|---|---|
| MU TEMP-VISC FACTOR | .90364 | TEMFAC |
| MU TEMP-VISC FACTOR | 1.00006 | TEMFACC |
| WIDTH FACTOR | 1 | WIDFAC |
| MU SPEED FACTOR | .985085 | SPDFAC |
| MU HIGH SPEED FACTOR | 1.28679 | HSPDFAC |
| EQUIV DIAM OF ROLLING - SUN | .32756 | DRS |
| EQUIV DIAM OF ROLLING - RING | 1.11667 | DRR |
| HERTZ DUE TO DLIFE | 236971 | PMSI |
| MU HERTZ FACTOR | .997394 | PFC |
| AVAILABLE MU ON SUN | .10738 | AMUS |
| REQUIRED MU ON SUN | .06466 | MUS |
| SUN CONTACT FORCE - TFP/AMRI | 2594.38 | CFI |
| MAJOR SUN CONTACT DIA | .60554 | MAJS |
| MINOR SUN CONTACT DIA | .02302 | MINS |
| SPECIFIED SUN WIDTH | .4 | EFSD |
| MAJOR RING CONTACT DIA | .13188 | MAJR |
| MINOR RING CONTACT DIA | .09688 | MINR |
| SPECIFIED RING WIDTH | .2 | EFRD |
| RING CONTACT FORCE | 2594.77 | CFOO |
| APPROX. PLANET WEIGHT | .238512 | W |
| PLANET CENTRIFUGAL FORCE | .391147 | CENF |
| RING HERTZ ROARK 4 | 258580 | PMRRR |
| RING HERTZ DUE TO PMRR | 274078 | PMRR |
| RING LIFE DUE TO PMRR | 4421.72 | RLIFE |
| AVAILABLE MU ON RING | .10715 | AMUR |
| REQUIRED MU ON RING | .06465 | MURNG |

**************************************************** STRESSES & DEFLECTIONS

| | | |
|---|---|---|
| BENDING RING DEFLECTION | .00052 | DELTAI |
| HERTZ DEFLECTION-SUN (ROARK) | .00097 | DESUNI |
| HERTZ DEFLECTION-RING (ROARK) | .00208 | DERINI |
| RING CENTR INNER STRESS | 0 | TSTI |
| RING CENTR OUTER STRESS | 0 | TSTO |
| RING CENTRIFUGAL STRESS | 0 | CENTST |
| RING CENTRIFUGAL DEFLECTION | 0 | CENDEL |
| TOTAL RADIAL RING DEFLECTION | .00357 | TD |

****************************************************

| | | |
|---|---|---|
| RADIUS OF CURVATURE-PLANET | 50 | PC |
| RADIUS OF CURVATURE-RING | 2 | RCR |

OUTPUT AS TORQUE IS VARIED FROM 1/3 TO DOUBLE

| PERCENT H.P. | 33 | 66 | 100 | 133 | 166 | 200 |
|---|---|---|---|---|---|---|
| HORSEPOWER | 1.7 | 3.4 | 5.2 | 6.9 | 8.6 | 10.4 |
| SUN LIFE | 1910.9 | 1910.9 | 1910.9 | 1910.9 | 1910.9 | 1910.9 |
| RING LIFE | 4421.7 | 4421.7 | 4421.7 | 4421.7 | 4421.7 | 4421.7 |
| PLT BRG RPM | -576 | -576 | -576 | -576 | -576 | -576 |
| PLT BRG LOAD | 111 | 223 | 335 | 447 | 559 | 671 |
| TF PER ROLLER | 55.9224 | 111.845 | 167.767 | 223.69 | 279.612 | 335.535 |

| | | | | | | |
|---|---|---|---|---|---|---|
| CF ON SUN | 2594 | 2594 | 2594 | 2594 | 2594 | 2594 |
| CF ON RING | 2594 | 2594 | 2594 | 2594 | 2594 | 2594 |
| REQ MU-SUN | .02155 | .04311 | .06466 | .08622 | .10777 | .12933 |
| AVAIL MU-SUN | .10738 | .10738 | .10738 | .10738 | .10738 | .10738 |
| REQ MU-RNG | .02155 | .0431 | .06465 | .0862 | .10776 | .12931 |
| AVAIL MU-RNG | .10748 | .10748 | .10748 | .10748 | .10748 | .10748 |
| MEAN HERTZ-SUN | 236971 | 236971 | 236971 | 236971 | 236971 | 236971 |
| MEAN HERTZ-RNG | 258580 | 258580 | 258580 | 258580 | 258580 | 258580 |
| MAJOR DIA.SUN | .60554 | .60554 | .60554 | .60554 | .60554 | .60554 |
| MINOR DIA.SUN | .02302 | .02302 | .02302 | .02302 | .02302 | .02302 |
| MAJOR DIA.RING | .13188 | .13188 | .13188 | .13188 | .13188 | .13188 |
| MINOR DIA.RING | .09688 | .09688 | .09688 | .09688 | .09688 | .09688 |
| FILM-SUN | .000001 | .000001 | .000001 | .000001 | .000001 | .000001 |
| FILM-RING | .000001 | .000001 | .000001 | .000001 | .000001 | .000001 |
| ETU LOSS | .7 | 1.4 | 2.2 | 2.9 | 3.6 | 4.4 |
| RING DEF-ROL | .00052 | .00052 | .00052 | .00052 | .00052 | .00052 |
| SUN CF DEF | .00097 | .00097 | .00097 | .00097 | .00097 | .00097 |
| RING CF DEF | .00208 | .00208 | .00208 | .00208 | .00208 | .00208 |
| TOT RAD DEF | .00357 | .00357 | .00357 | .00357 | .00357 | .00357 |
| CF LACKING | -2073.5 | -1552.7 | -1032 | -511.2 | 9.5 | 530.3 |
| SUN TORQUE | 5.8905 | 11.781 | 17.6715 | 23.562 | 29.4525 | 35.343 |
| SUN SHEAR STS | 118.842 | 237.684 | 356.527 | 475.369 | 594.211 | 713.053 |
| ID STRESS @ A | 8298.51 | 8298.51 | 8298.51 | 8298.51 | 8298.51 | 8298.51 |
| ID STRESS @ B | -9614.83 | -9614.83 | -9614.83 | -9614.83 | -9614.83 | -9614.83 |
| OD STRESS @ A | -3407.21 | -3407.21 | -3407.21 | -3407.21 | -3407.21 | -3407.21 |
| OD STRESS @ B | 13073.5 | 13073.5 | 13073.5 | 13073.5 | 13073.5 | 13073.5 |

THRUST & RPM VALUES FOR TIMKEN TYPE DRIVE

| | | | | | | |
|---|---|---|---|---|---|---|
| SUN RPM | 1545.45 | 1545.45 | 1545.45 | 1545.45 | 1545.45 | 1545.45 |
| SUN THRUST | 10.8311 | 10.8311 | 10.8311 | 10.8311 | 10.8311 | 10.8311 |
| PLANET RPM | -576 | -576 | -576 | -576 | -576 | -576 |
| PLANET THRUST | 12.2878 | 12.2878 | 12.2878 | 12.2878 | 12.2878 | 12.2878 |
| CARRIER RPM | 236.381 | 236.381 | 236.381 | 236.381 | 236.381 | 236.381 |
| CARRIER THRUST | 49.1512 | 49.1512 | 49.1512 | 49.1512 | 49.1512 | 49.1512 |
| RING RPM | 0 | 0 | 0 | 0 | 0 | 0 |
| RING THRUST | 59.9823 | 59.9823 | 59.9823 | 59.9823 | 59.9823 | 59.9823 |
| SHIM IF ON SUN | 3.42 | 3.42 | 3.42 | 3.42 | 3.42 | 3.42 |
| SHIM FOR RING | .6175 | .6175 | .6175 | .6175 | .6175 | .6175 |

| | | |
|---|---|---|
| TANGENT OF SUN TAPER ANGLE | 1.04385E-03 | TAPTAN |
| SUN TAPER ANGLE | 5.98125E-02 | TAPANG |
| TANGENT OF PLANET TAPER ANGLE | 2.36848E-03 | TAPTANP |
| PLANET TAPER ANGLE | .135714 | TAPANGP |
| PLANET CENTERLINE ANGLE | .195526 | PLAANG |
| RING TAPER ANGLE | .33124 | TAPANGR |

ELAPSED TIME FOR THIS RUN WAS: 0 MIN. AND 40 SEC.

2 STAGE F.R.D.  18 JAN 90
SUN INPUT  CARRIER OUTPUT

```
*************** INPUT DATA *********************
1=FIRST STAGE   2=SECOND STAGE    1         STAGE
OD OF SUN                         .35       SDIA
ID OF RING                        3.5       RDIA
OD OF RING                        4.5       RODIA
RING WIDTH                        1.5       RWDTH
SUN SPEED                         17000     SSPD
CARRIER SPEED                     0         CSPD
RING SPEED                        0         RSPD
NUMBER OF PLANETS                 3         PLAS
DESIGN HORSEPOWER-CARRIER         5.27635   CDHP
DESIGN LIFE                       3000      DLIFE
LIFE SAFETY FACTOR                1         LFAC
BASE OIL COEFFICIENT              .95       OILFAC
MU COMPUTATION FACTOR             1         COMFAC
OIL FILM FACTOR                   2.25      FFAC
OIL OPERATING TEMPERATURE         175       TEM
ASSUMED CREEP FOR BTU LOSS        .005      CREEP
WIDTH BETWEEN GROOVES             .1        GR
PLANET WEIGHT FOR ANALYSIS        0         W
EFF SUN WIDTH FOR ANALYSIS        .4        EFSD
EFF RING WIDTH FOR ANALYSIS       .2        EFRD
RADIUS OF CURVATURE-PLANET        50        PC
RADIUS OF CURVATURE-RING          2         RCR
RING NEUTRAL RADIUS               0         RAD
RING MOMENT OF INERIA             0         MOMINT
RING X-SECTIONAL AREA             0         RAREA
RING SHAPE FACTOR                 1.2       SFAC
CENTIFUGAL DEFLECTION FACTOR      1         CFFAC
PRELOAD FOR TIMKEN                60        PRRLOD
PRELOAD CONSTANT=1                1         PRECONS
TAPANG                            .2        TAPANG
BALLDIA                           .25       BALLDIA
CAMSPR-BOTH SUN & RING            10        CAMSPR

*************** OUTPUT DATA *********************
********************************************* DRIVE GEOMETRY
     RING DATA
RADIAL WIDTH OF RING              .5        RIO
RING MOMENT OF INERTIA            .01562    MOMINT
RING X-SECTIONAL AREA             .75       RAREA
RING MEAN RADIUS                  2         RAD
     PLANET DATA
PLANET SEPARATION ANGLE           120       BETA
PLANET DIAMETER                   1.575     PDIA
PLANET RADIUS OF REVOLUTION       .9625     R
PLANET CENTER SPACING             1.6671    PLSPC
PLANET SEPERATION                 .09209    PLSEP
********************************************* MISC DATA
RING TO SUN RATIO                 10        RTS
CARRIER OUT RATIO                 11        RATIOC
DEFL CONSTANT (AT LOAD)           .04368    DCON
DEFL CONSTANT (BETWEEN LOAD)      .02741    DCON2
********************************************* SPEEDS
CARRIER RPM                       1545.45   CSPD
PLANET RPM (ABS)                  -1888.89  PRPMA
```

| | | |
|---|---|---|
| PLANET RPM (BEARINGS) | −3434.34 | PRPM |
| SURFACE SPEED − SUN | 23.6 | FPS |
| SURFACE SPEED − RING | 23.6 | FPSR |
| SSPD TO CSPD RATIO | 11 | RATIO1 |
| RSPD TO CSPD RATIO | 0 | RATIO2 |
| LIFE CONSTANT FOR SUN | 406657 | CIS |
| LIFE CONSTANT FOR RING | 511951 | CIR |

**************************************************** TORQUES AND HORSEPOWER

| | | |
|---|---|---|
| CARRIER HORSEPOWER | 5.27635 | CDHP |
| CARRIER TORQUE | 17.9309 | CTORQ |
| PLANET BEARING FORCE | 74.5181 | PFORC |
| PLANET TANGENTIAL FORCE | 37.259 | TFP |
| SUN TORQUE | 1.63008 | STORQ |
| SUN HORSEPOWER | 5.27635 | SDHP |
| RING TORQUE | 16.3008 | RTORQ |
| RING HORSEPOWER | 0 | RDHP |

**************************************************** TRACTION CONTACT DATA

| | | |
|---|---|---|
| MU TEMP-VISC FACTOR | .939446 | TEMFAC |
| MU TEMP-VISC FACTOR | 1.00306 | TEMFAC2 |
| WIDTH FACTER | 1 | WIDFAC |
| MU SPEED FACTOR | .940033 | SPDFAC |
| MU HIGH SPEED FACTOR | 1.22308 | HSPDFAC |
| EQUIV DIAM OF ROLLING − SUN | .21415 | DRS |
| EQUIV DIAM OF ROLLING − RING | 1.23111 | DRR |
| HERTZ DUE TO DLIFE | 184823 | PMSI |
| MU HERTZ FACTOR | .959646 | PFC |
| AVAILABLE MU ON SUN | .09859 | AMUS |
| REQUIRED MU ON SUN | .06725 | MUS |
| SUN CONTACT FORCE − TFP/AMRI | 553.974 | CFI |
| MAJOR SUN CONTACT DIA | .37196 | MAJS |
| MINOR SUN CONTACT DIA | .01026 | MINS |
| SPECIFIED SUN WIDTH | .4 | EFSD |
| MAJOR RING CONTACT DIA | .0777 | MAJR |
| MINOR RING CONTACT DIA | .06376 | MINR |
| SPECIFIED RING WIDTH | .2 | EFRD |
| RING CONTACT FORCE | 572.767 | CFOO |
| APPROX. PLANET WEIGHT | .287722 | W |
| PLANET CENTRIFUGAL FORCE | 18.7929 | CENF |
| RING HERTZ ROARK 4 | 147204 | PMRRR |
| RING HERTZ DUE TO PMRR | 122639 | PMRR |
| RING LIFE DUE TO PMRR | 258878 | RLIFE |
| AVAILABLE MU ON RING | .07851 | AMUR |
| REQUIRED MU ON RING | .06505 | MURNG |

**************************************************** STRESSES & DEFLECTION

| | | |
|---|---|---|
| BENDING RING DEFLECTION | .00021 | DELTAI |
| HERTZ DEFLECTION-SUN (ROARK) | .00029 | DESUNI |
| HERTZ DEFLECTION-RING (ROARK) | .00072 | DERINI |
| RING CENTR INNER STRESS | 0 | TSTI |
| RING CENTR OUTER STRESS | 0 | TSTO |
| RING CENTRIFUGAL STRESS | 0 | CENTST |
| RING CENTRIFUGAL DEFLECTION | 0 | CENDEL |
| TOTAL RADIAL RING DEFLECTION | .00122 | TD |

****************************************************

| | | |
|---|---|---|
| RADIUS OF CURVATURE-PLANET | 50 | PC |
| RADIUS OF CURVATURE-RING | 2 | RCR |

OUTPUT AS TORQUE IS VARIED FROM 1/3 TO DOUBLE

| PERCENT H.P. | 33 | 66 | 100 | 133 | 166 | 200 |
|---|---|---|---|---|---|---|
| HORSEPOWER | 1.7 | 3.5 | 5.2 | 7 | 8.7 | 10.5 |
| SUN LIFE | 2659 | 2659 | 2659 | 2659 | 2659 | 2659 |
| RING LIFE | 258878 | 258878 | 258878 | 258878 | 258878 | 258878 |
| PLT BRG RPM | −3434 | −3434 | −3434 | −3434 | −3434 | −3434 |
| PLT BRG LOAD | 24 | 49 | 74 | 99 | 124 | 149 |
| TF PER ROLLER | 12.4197 | 24.8394 | 37.259 | 49.6787 | 62.0984 | 74.5181 |
| CF ON SUN | 553 | 553 | 553 | 553 | 553 | 553 |

|  | | | | | |  |
|---|---|---|---|---|---|---|
| CF ON RING | 572 | 572 | 572 | 572 | 572 | 572 |
| REQ MU-SUN | .02241 | .04483 | .06725 | .08967 | .11209 | .13451 |
| AVAIL MU-SUN | .09859 | .09859 | .09859 | .09859 | .09859 | .09859 |
| REQ MU-RNG | .02168 | .04336 | .06505 | .08673 | .10841 | .1301 |
| AVAIL MU-RNG | .09012 | .09012 | .09012 | .09012 | .09012 | .09012 |
| MEAN HERTZ-SUN | 184823 | 184823 | 184823 | 184823 | 184823 | 184823 |
| MEAN HERTZ-RNG | 147204 | 147204 | 147204 | 147204 | 147204 | 147204 |
| MAJOR DIA.SUN | .37196 | .37196 | .37196 | .37196 | .37196 | .37196 |
| MINOR DIA.SUN | .01026 | .01026 | .01026 | .01026 | .01026 | .01026 |
| MAJOR DIA.RING | .0777 | .0777 | .0777 | .0777 | .0777 | .0777 |
| MINOR DIA.RING | .06376 | .06376 | .06376 | .06376 | .06376 | .06376 |
| FILM-SUN | .000004 | .000004 | .000004 | .000004 | .000004 | .000004 |
| FILM-RING | .000007 | .000007 | .000007 | .000007 | .000007 | .000007 |
| BTU LOSS | .7 | 1.4 | 2.2 | 2.9 | 3.6 | 4.4 |
| RING DEF-ROL | .00021 | .00021 | .00021 | .00021 | .00021 | .00021 |
| SUN CF DEF | .00029 | .00029 | .00029 | .00029 | .00029 | .00029 |
| RING CF DEF | .00072 | .00072 | .00072 | .00072 | .00072 | .00072 |
| TOT RAD DEF | .00122 | .00122 | .00122 | .00122 | .00122 | .00122 |
| CF LACKING | -428 | -302 | -176 | -50 | 75.8 | 201.8 |
| SUN TORQUE | .543361 | 1.08672 | 1.63008 | 2.17344 | 2.7168 | 3.26016 |
| SUN SHEAR STS | 64.5438 | 129.088 | 193.631 | 258.175 | 322.719 | 387.263 |
| ID STRESS @ A | 2269.21 | 2269.21 | 2269.21 | 2269.21 | 2269.21 | 2269.21 |
| ID STRESS @ B | -3236.55 | -3236.55 | -3236.55 | -3236.55 | -3236.55 | -3236.55 |
| OD STRESS @ A | -1388.56 | -1388.56 | -1388.56 | -1388.56 | -1388.56 | -1388.56 |
| OD STRESS @ B | 3676.88 | 3676.88 | 3676.88 | 3676.88 | 3676.88 | 3676.88 |

THRUST & RPM VALUES FOR TIMKEN TYPE DRIVE

|  | | | | | |  |
|---|---|---|---|---|---|---|
| SUN RPM | 17000 | 17000 | 17000 | 17000 | 17000 | 17000 |
| SUN THRUST | 5.99217 | 5.99217 | 5.99217 | 5.99217 | 5.99217 | 5.99217 |
| PLANET RPM | -3434 | -3434 | -3434 | -3434 | -3434 | -3434 |
| PLANET THRUST | 17.9765 | 17.9765 | 17.9765 | 17.9765 | 17.9765 | 17.9765 |
| CARRIER RPM | 1545.45 | 1545.45 | 1545.45 | 1545.45 | 1545.45 | 1545.45 |
| CARRIER THRUST | 53.9296 | 53.9296 | 53.9296 | 53.9296 | 53.9296 | 53.9296 |
| RING RPM | 0 | 0 | 0 | 0 | 0 | 0 |
| RING THRUST | 59.9217 | 59.9217 | 59.9217 | 59.9217 | 59.9217 | 59.9217 |
| SHIM IF ON SUN | .3495 | .3495 | .3495 | .3495 | .3495 | .3495 |
| SHIM FOR RING | .0349 | .0349 | .0349 | .0349 | .0349 | .0349 |

| | | |
|---|---|---|
| TANGENT OF SUN TAPER ANGLE | 3.49042E-03 | TAPTAN |
| SUN TAPER ANGLE | .2 | TAPANG |
| TANGENT OF PLANET TAPER ANGLE | 1.57087E-02 | TAPTANP |
| PLANET TAPER ANGLE | .900035 | TAPANGP |
| PLANET CENTERLINE ANGLE | 1.10004 | PLAANG |
| RING TAPER ANGLE | 2.00007 | TAPANGR |

ELAPSED TIME FOR THIS RUN WAS: 0 MIN. AND 40 SEC.

What is claimed is:

1. A traction roller transmission comprising a housing, two planetary type transmission structures arranged in tandem in said housing, each including a sun roller, a traction ring having a traction surface spaced from said sun roller and planetary traction rollers disposed in the space between, and in engagement with, said sun roller and traction ring, and a planetary traction roller support member rotatably supporting said traction rollers, the planetary traction roller support member of one of said planetary type transmission structures having the sun roller of the other planetary type transmission structure associated for rotation therewith, an input shaft connected to or forming the sun roller of said one planetary type transmission structure, and an output shaft associated with the planetary traction roller support structure of said other planetary type transmission structure, means for forcing said traction rings toward one another with a force which depends on a torque transmitted through the transmission, the traction surfaces of said traction rings being axially curved and said planetary type traction rollers being supported such that their axes are inclined and intersect the transmission axis at spaced points outside the traction roller transmission and at acute angles selected so as to provide radial engagement forces for the two planetary type traction rollers with the respective sun rollers and traction ring sufficient to accommodate the different relative torque values transmitted through the two planetary type transmission structures.

2. A traction roller transmission according to claim 1, wherein one of said traction rings is fixed in said housing and the other is provided with an axial cam structure adapted to force the other traction ring toward the one traction ring and in engagement with the planetary traction rollers with a force with a force which depends on the torque transmitted through the transmission.

3. A traction roller transmission according to claim 2, wherein springs are disposed between the traction rings to insure reduction of their engagement with the traction rollers when the torque transmitted through the transmission decreases.

4. A traction roller transmission according to claim 1, wherein the surfaces of the sun and of the planetary traction rollers of at least the planetary type transmission structures are conical and any axial tangent on the traction rollers and the sun intersect on the transmission axis.

5. A traction roller transmission according to claim 1, wherein the surfaces of the sun and of the planetary traction rollers of the other planetary type transmission structure are conical and any axial tangents on said surfaces intersect on the transmission axis and wherein the surface of the sun of the one planetary type transmission structure is essentially straight cylindrical and the surfaces of the planetary traction rollers of the one planetary type transmission structure are conical and the axial tangents of the planetary traction rollers intersect the axes of the respective rollers on the cylinder envelope of the cylindrical sun roller.

6. A traction roller transmission according to claim 1, wherein the planetary traction rollers are supported on said other support structure by shaft members extending through said traction rollers and being interconnected at their free ends by a connecting ring and wherein an axial thrust bearing is arranged between said connecting ring and the intermediate transmission member so as to transmit the axial transmission engagement forces therebetween.

7. A traction roller transmission according to claim 6, wherein axial thrust bearings are arranged between the planetary traction rollers and the intermediate transmission member and, respectively, the connecting ring.

* * * * *